United States Patent
Dai (10) Patent No.: US 9,904,397 B2
(45) Date of Patent: Feb. 27, 2018

(54) ELECTRONIC DEVICE AND METHOD FOR SWITCHING BETWEEN TEXT INPUT ASSISTANTS

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Ji-Lin Dai, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 31 days.

(21) Appl. No.: 15/163,789

(22) Filed: May 25, 2016

(65) Prior Publication Data
US 2017/0255312 A1    Sep. 7, 2017

(30) Foreign Application Priority Data
Mar. 1, 2016    (CN) .......................... 2016 1 0117490

(51) Int. Cl.
G06F 3/041    (2006.01)

(52) U.S. Cl.
CPC .......... G06F 3/0414 (2013.01); G06F 3/0416 (2013.01)

(58) Field of Classification Search
CPC .................................................... G06F 3/0414
USPC .................... 178/18.01–19.07; 345/173–178
See application file for complete search history.

(56) References Cited

U.S. PATENT DOCUMENTS

| 9,164,605 B1* | 10/2015 | Pirogov | G06F 3/041 |
| 2016/0132139 A1* | 5/2016 | Du | G06F 3/0488 345/173 |
| 2017/0031588 A1* | 2/2017 | Berger | G06F 3/015 |

* cited by examiner

*Primary Examiner* — Michael Pervan
(74) *Attorney, Agent, or Firm* — ScienBiziP, P.C.

(57) ABSTRACT

In a method for switching between text input assistant an electronic device, a touch force of a touch operation is sensed by a force sensor of an input device and converted into a first electrical signal. The touch force works to formulate the first electrical signal. The text input assistant associated with such touch force is determined according to a preset relationship table. The determined text input assistant is determined to be the same as or different from a current text input assistant, and if the determined text input assistant is different from the current text input assistant, the device switches the current text input assistant to the determined text input assistant. An input interface associated with the new text input assistant is also displayed.

9 Claims, 5 Drawing Sheets

ELECTRONIC DEVICE AND METHOD FOR SWITCHING BETWEEN TEXT INPUT ASSISTANTS

CROSS-REFERENCE TO RELATED APPLICATIONS

This application claims priority to Chinese Patent Application No. 201610117490.2 filed on Mar. 1, 2016, the contents of which are incorporated by reference herein.

FIELD

The subject matter herein generally relates to human interact devices, and more particularly relates to an electronic device and a method for switching between text input assistants of the electronic device.

BACKGROUND

Most people use text-input on their electronic devices. With a development of computing technology, many ways of offering assistance in inputting text are supplied by the electronic devices.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the word "module," as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprise connected logic units, such as gates and flip-flops, and may comprise programmable units, such as programmable gate arrays or processors. The modules described herein may be implemented as either software and/or hardware modules and may be stored in any type of non-transitory computer-readable storage medium or other computer storage device. The term "comprising," when utilized, means "including, but not necessarily limited to"; it specifically indicates open-ended inclusion or membership in the so-described combination, group, series and the like.

Figure 1:
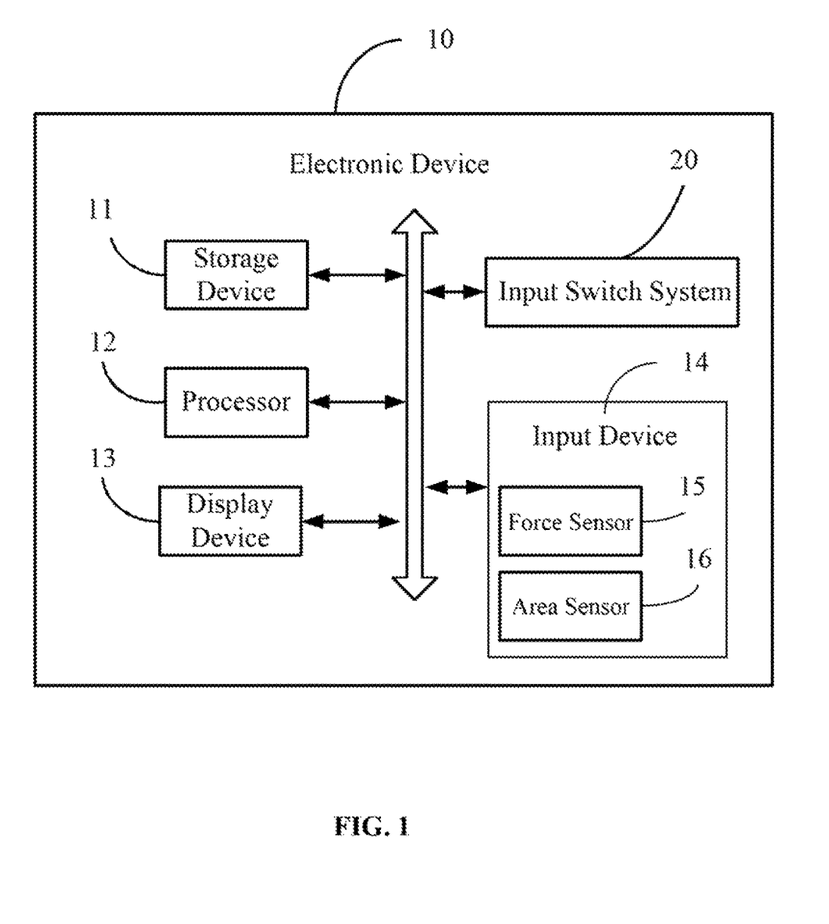
FIG. 1 is a block diagram of one embodiment of a hardware environment for executing a system for switching between text-input assistants.

FIG. 1 is a block diagram of one embodiment of a hardware environment for executing a system for switching between different types of computer-assistance in inputting text (hereinafter input switch system). The input switch system 20 is installed and runs in an apparatus, for example an electronic device 10. In at least the one embodiment as shown in FIG. 1, the electronic device 10 includes, but is not limited to, a storage device 11, at least one processor 12, a display device 13, and an input device 14. The storage device 11, the at least one processor 12, the display device 13, and the input device 14 are connected by a system bus. The electronic device 10 can be a tablet computer, a notebook computer, a smart phone, a personal digital assistant (PDA), or other suitable electronic device. FIG. 1 illustrates only one example of the electronic device; other examples can include more or fewer components than illustrated, or have a different configuration of the various components in other embodiments.

The input switch system 20 can calculate the touch force of a touch operation on the input device 14 and determine one type out of several types of assistance offered by the electronic device 10 for the inputting of text (altogether hereinafter "text input assistants"), each text input assistant being associated with the calculated touch force according to a preset relationship table. The input switch system 20 further determines whether a determined text input assistant is the same as the current text input assistant of the electronic device 10. When the determined text input assistant is different from the current text input assistant, the input switch system 20 switches from the current text input assistant to the determined text input assistant and displays an input interface associated with the determined text input assistant.

In at least one embodiment, the storage device 11 can store program instructions executed by the processor 12 and temporarily store data which has been input or data to be input. The storage device 11 can include various types of non-transitory computer-readable storage mediums. For example, the storage device 11 can be an internal storage system, such as a flash memory, a random access memory (RAM) for temporary storage of information, and/or a read-only memory (ROM) for permanent storage of information. The storage device 11 can also be an external storage system, such as a hard disk, a storage card, or a data storage medium. In at least one embodiment, the storage device 11 can store program instructions for executing a method associated with a touch force for switching between text input assistants or a method associated with a touch area of a touch operation for switching between text input assistants, or both.

The at least one processor 12 can be a central processing unit (CPU), a microprocessor, other data processor chip, or integrated circuit that performs functions of the input switch system 20 in the electronic device 10. The display device 13 can display information to users. In at least one embodiment, the display device 13 can display input interfaces for users to input information while the electronic device 10 is under a different text input assistant. In at least one embodiment, the electronic device 10 can supply text input assistants which include, but are not limited to, a pinyin-to-character assistant, an English-word assistant, a handwriting assistant, an audio assistant, a numerical character assistant, and so on. The pinyin-to-character assistant is used to input Chinese characters and/or words.

The input device 14 can receive input operations. In one embodiment, the display device 13 and the input device 14 cooperate to form a touch screen. The touch screen includes a liquid crystal display screen. The input device 14 further includes a force sensor 15 and an area sensor 16.

The force sensor 15 can sense touch forces of touch operations on the input device 14 and convert the sensed touch force of the touch operation into first electrical signals.

The area sensor 16 can sense areas of touch operations on the input device 14 and convert the sensed areas of the touch operation into second electrical signals.

In at least one embodiment, the force sensor 15 can generate first electrical signals which are each of a different value of the sensed forces of the touch operations. For example, if a value of a sensed force of a touch operation is F1, then the force sensor 15 generates a first electrical signal (hereinafter first electrical signal Ef1) which contains information that the sensed force of a touch operation is F1; if a value of a sensed force of a touch operation is F2, then the force sensor 15 generates a first electrical signal which contains information that the sensed force of a touch operation is F2 (hereinafter first electrical signal Ef2). That is, the two first electrical signals are different because the force values in the first electrical signals Ef1 and Ef2 are different.

The area sensor 16 can sense areas of touch operations on the input device 14 and generate different second electrical signals according to different sizes of the sensed areas of the touch operations. For example, if a size of a sensed area of a touch operation is S1, then the force sensor 15 generates a second electrical signal which contains information that the sensed area of a touch operation is S1 (hereinafter second electrical signal Es1); if a value of a sensed area of a touch operation is S2, then the force sensor 15 generates a second electrical signal which contains information that the sensed area of a touch operation is S2 (hereinafter second electrical signal Es2). That is, the two second electrical signals are different because the area values contained in the second electrical signals A and B are different.

To a person skilled in the art, it is known the touch force of a touch operation is associated with a touch area of the touch operation. In at least one embodiment, the input switch system 20 can obtain touch force and touch area of a touch operation at the same time. For example, when the touch force F1 of a touch operation is associated with the touch area S1 of a single touch operation; the touch force F2 (not equal to F1) of a touch operation would be associated with the touch area S2 of the same touch operation. Then, the input switch system 20 can calculate a coefficient K of a touch force F of a touch operation to a touch area S of the same touch operation according to the obtained touch forces and touch areas. That is, a relationship between the touch force and the touch area of a single touch operation is F=KS, where F denotes a touch force of a touch operation, S denotes a touch area of the touch operation, and K denotes the coefficient of the touch force to the touch area. That is, the input switch system 20 can self-learning, and can establish a formula F=KS through the self-learning, the K only denotes a relationship between a touch force and a touch size of a same operation, and the K is not P (pressure) and different from P. Moreover, to different users, values of K are different. It may associate with a user's touch operation habit.

Figure 2:
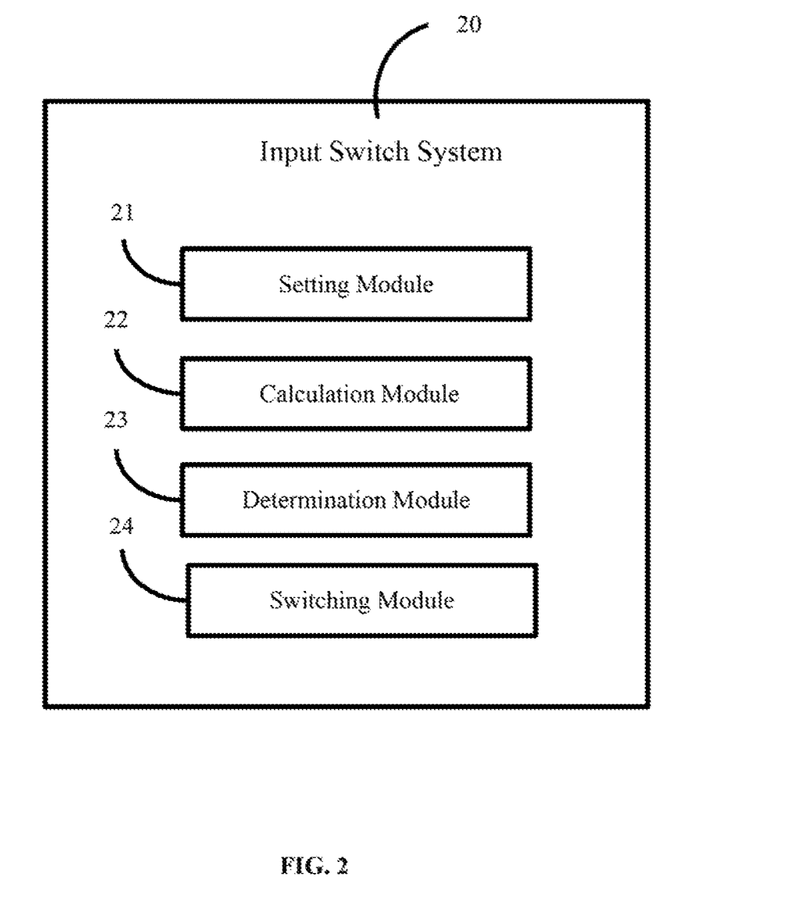
FIG. 2 is a block diagram of one embodiment of function modules of the system in FIG. 1.

FIG. 2 is a block diagram of one embodiment of the function modules of the input switch system 20. In at least one embodiment, the input switch system 20 can include a setting module 21, a calculation module 22, a determination module 23, and a switching module 24. The function modules 21, 22, 23, and 24 can include computerized codes in the form of one or more programs, which are stored in the storage device 11. The at least one processor 12 executes the computerized codes to provide functions of the function modules 21-24.

The setting module 21 can define a table recording relationships between each of the touch forces of touch operation on the input device 14 and each of the different text input assistant. If the touch operation is one finger that touches the input device 14 for inputting a character, the pressure of the touch operation is a pressure of the finger touching the input device 14. If the touch operation is at least two fingers simultaneously touching the input device 14 for inputting a character, the pressure of the touch operation is a total pressure of all fingers touching the input device 14. For example, a first touch force is associated with the pinyin-to-character text input assistant; a value of the first touch force is between 0 Newtons and 3 Newtons. A second touch force can be associated with the English-word text input assistant, and a value of the second touch force is between 4 Newtons and 6 Newtons. A third touch force can be associated with the numerical character text input assistant, and a value of the second touch force is between 7 Newtons and 10 Newtons.

In an alternative embodiment, the setting module 21 can define a table recording relationships between each of the touch areas of touch operations on the input device 14 and each text input assistant. If the touch operation is one finger that touches the input device 14 for inputting a character, the touch area of the touch operation is a touch area of the finger touching the input device 14. If the touch operation is at least two fingers simultaneously touching the input device 14 for inputting a character, the touch area of the touch operation is a total touch area of all fingers touching the input device 14. For example, a first touch area is associated with the pinyin-to-character text input assistant; a size of the first touch area is between 0 $cm^2$ and 2 $cm^2$. A second touch area can be associated with the English-word text input assistant, and a size of the second touch area is between 3 $cm^2$ and 5 $cm^2$. A third touch force can be associated with the numerical character text input assistant, and a size of the third touch force is between 6 $cm^2$ and 8 $cm^2$.

In other embodiments, the setting module 21 can define a table recording relationships between each of the touch areas and the touch forces of touch operations on the input device 14 and each text input assistant. That is, each text input assistant is not only related by the touch area of the touch operation, but also related by the touch force of the touch operation. For example, the pinyin-to-character text input assistant is associated with the first touch force and the first touch area. The English-word text input assistant is associated with the second touch force and the second touch area. The numerical character text input assistant is associated with the third touch force and the third touch area.

The calculation module 22 can calculate touch force of a touch operation according to the first electrical signal. The calculation module 22 can calculate touch area of a touch operation according to the second electrical signal.

The determination module 23 can determine upon a text input assistant associated with the calculated touch force and/or touch area according to the preset relationship. In an alternative embodiment, the determination module 23 further determines that the relationship between the touch force and the touch area of a touch operation is F=KS, where F denotes a touch force of a touch operation, S denotes a touch area of the touch operation, and K denotes the coefficient of the touch force and the touch area. The calculation module 22 further can touch force of a touch operation according to the relationship between the touch force and the touch area of a touch operation and the touch area of the touch operation.

The determination module 23 can determine whether the determined text input assistant is the same as a current text input assistant for the electronic device 10. In an alternative embodiment, the determination module 23 can further determine whether the force sensor works correctly.

When the determined text input assistant is different from the current text input assistant for the electronic device 10, the switching module 24 can switch from the current text input assistant to the determined text input assistant and display an input interface associated with the determined text input assistant.

Figure 3:
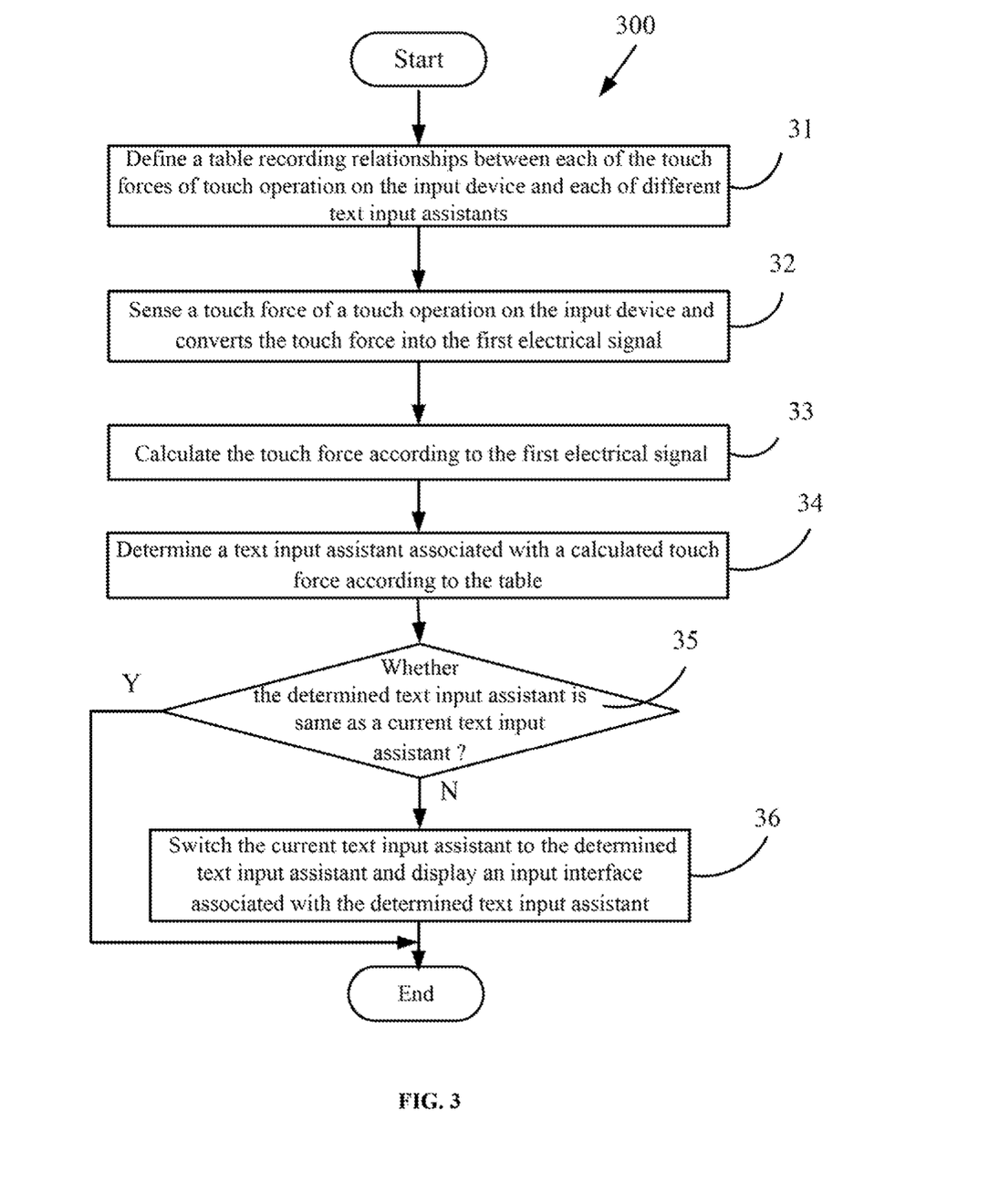
FIG. 3 is a flowchart according to one embodiment of a method for switching between text-input assistants, which is associated with a touch force.

FIG. 3 is a flowchart of a first embodiment of a method for switching between text-input assistants. The example method 300 is provided by way of example, as there are a variety of ways to carry out the method. The method 300 described below can be carried out using the configurations illustrated in FIGS. 1 and 2, for example, and various elements of these figures are referenced in explaining example method 300. Each block shown in FIG. 3 represents one or more processes, methods or subroutines, carried out in the exemplary method 300. Additionally, the illustrated order of blocks is by example only and the order of the blocks can change. The exemplary method 300 can begin at block 31. Depending on the embodiment, additional steps can be added, others removed, and the ordering of the steps can be changed.

At block 31, the setting module defines a table recording relationships between each of the touch forces of touch operation on the input device and each of different text input assistants.

In at least one embodiment, a first touch force is associated with the pinyin-to-character text input assistant; a second touch force is associated with the English-word text input assistant; and a third touch force is associated with the numerical character text input assistant.

At block 32, the force sensor senses a touch force of a touch operation on the input device, and converts the touch force into the first electrical signal.

In at least one embodiment, if the touch operation is at least two fingers simultaneously touching the input device 14 for inputting a character, the touch force is a total pressure of the touch forces of all fingers employed by the touch operation.

At block 33, the calculation module calculates the touch force according to the first electrical signal.

At block 34, the determination module determines a text input assistant associated with the calculated touch force according to the preset relationship.

At block 35, the determination module determines whether a determined text input assistant is the same as a current text input assistant for the electronic device. If no, the process goes to block 36; if yes, the process goes to end.

At block 36, the switching module switches the current text input assistant to the determined text input assistant, and displays an input interface associated with the determined text input assistant.

Figure 4:
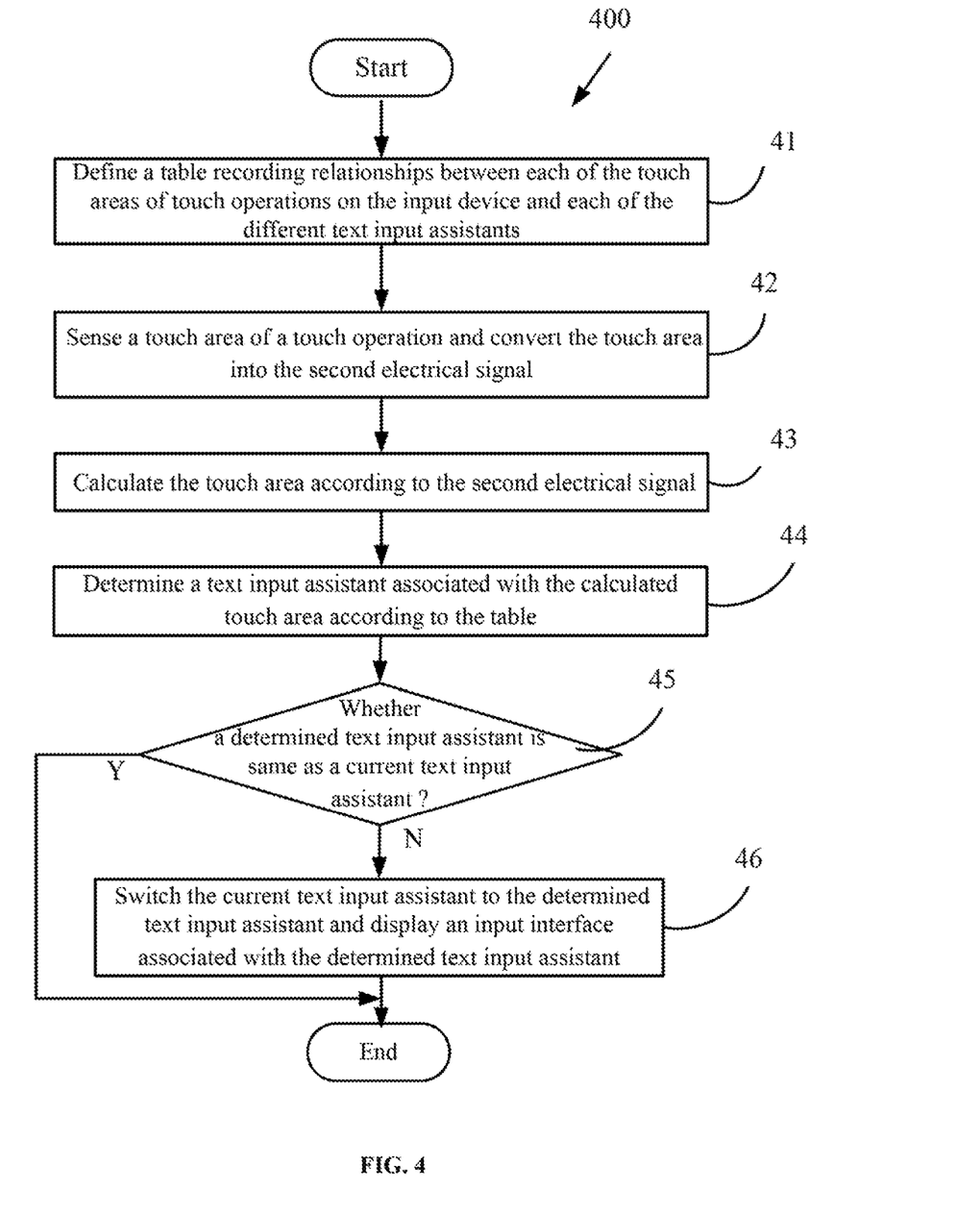
FIG. 4 is a flowchart according to one embodiment of a method for switching between text-input assistants, which is associated with a touch area.

FIG. 4 is a flowchart of a second embodiment of the method for switching between text-input assistants. The example method 400 is provided by way of example, as there are a variety of ways to carry out the method. The method 400 described below can be carried out using the configurations illustrated in FIGS. 1 and 2, for example, and various elements of these figures are referenced in explaining example method 400. Each block shown in FIG. 4 represents one or more processes, methods or subroutines, carried out in the exemplary method 400. Additionally, the illustrated order of blocks is by example only and the order of the blocks can change. The exemplary method 300 can begin at block 41. Depending on the embodiment, additional steps can be added, others removed, and the ordering of the steps can be changed.

At block 41, the setting module defines a table recording relationships between each of the touch areas of touch operation on the input device and each of the different text input between text input assistants.

In at least one embodiment, a first touch area is associated with the pinyin-to-character input way; a second touch area is associated with the English-word input way; and a third touch area is associated with the number character input way.

At block 42, the area sensor senses a touch area of a touch operation on the input device, and converts the touch area into the second electrical signal.

In at least one embodiment, if the touch operation is at least two fingers simultaneously touching the input device 14 for inputting a character, the sensed touch area of the touch operation is a total area of the touch areas of all fingers employed by the touch operation.

At block 43, the calculation module 22 calculates the touch area according to the second electrical signal.

At block 44, the determination module determines a text input assistant associated with the calculated touch area according to the preset relationship.

At block 45, the determination module determines whether a determined text input assistant is the same as a current text input assistant for the electronic device. If no, the process goes to block 46; if yes, the process goes to end.

At block 46, the switching module switches the current text input assistant to the determined text input assistant, and displays an input interface associated with the determined text input assistant.

The method for switching between text input assistants as shown by FIGS. 3 and 4 only relates to one factor such as touch force of a touch operation or a touch area of a touch operation. In an alternative embodiment, the method for switching between text input assistants that can also be related to two factors, that is not only related to the touch force of a touch operation, but also relates to a touch area of the touch operation at the same time. In other embodiments, the two factors can have a priority, for example, the touch force of a touch operation is priority than the touch area of a touch operation.

To a person skilled in the art, it is known a touch force of a touch operation is associated with a touch area of the same touch operation. The input switch system 20 can obtain a lot of touch forces of a touch operation, and simultaneously obtain touch areas of the touch operation. For example, the touch force F1 of a touch operation is associated with the touch area S1 of the same touch operation; the touch force F2 (not equal to F1) of a touch operation is associated with the touch area S2 of the same touch operation. Then, the input switch system 20 can calculate a coefficient K of a touch force F of a touch operation to a touch area S of the same touch operation according to the obtained touch forces and touch areas. That is, a relationship of the touch force and the touch area of a touch operation is F=KS, where F denotes a touch force of a touch operation, S denotes a touch area of the touch operation, and K denotes the coefficient of the touch force and the touch area.

In a third embodiment, as the display device 13 and the input device 14 cooperate to form a touch screen; and the touch screen includes a liquid crystal display. Moreover, it is assumed that when a user applies a greater touch force on the touch screen, the touch area of the touch operation is bigger; when a user applies a less touch force on the touch screen, the touch area of the touch operation is smaller. That is, the touch force of the touch operation is associated with a touch area of the same touch operation. Therefore, if the force sensor 15 does not correctly work, the input switch system 20 can also obtain the touch force of a touch operation according to the touch area of the touch operation.

Figure 5:
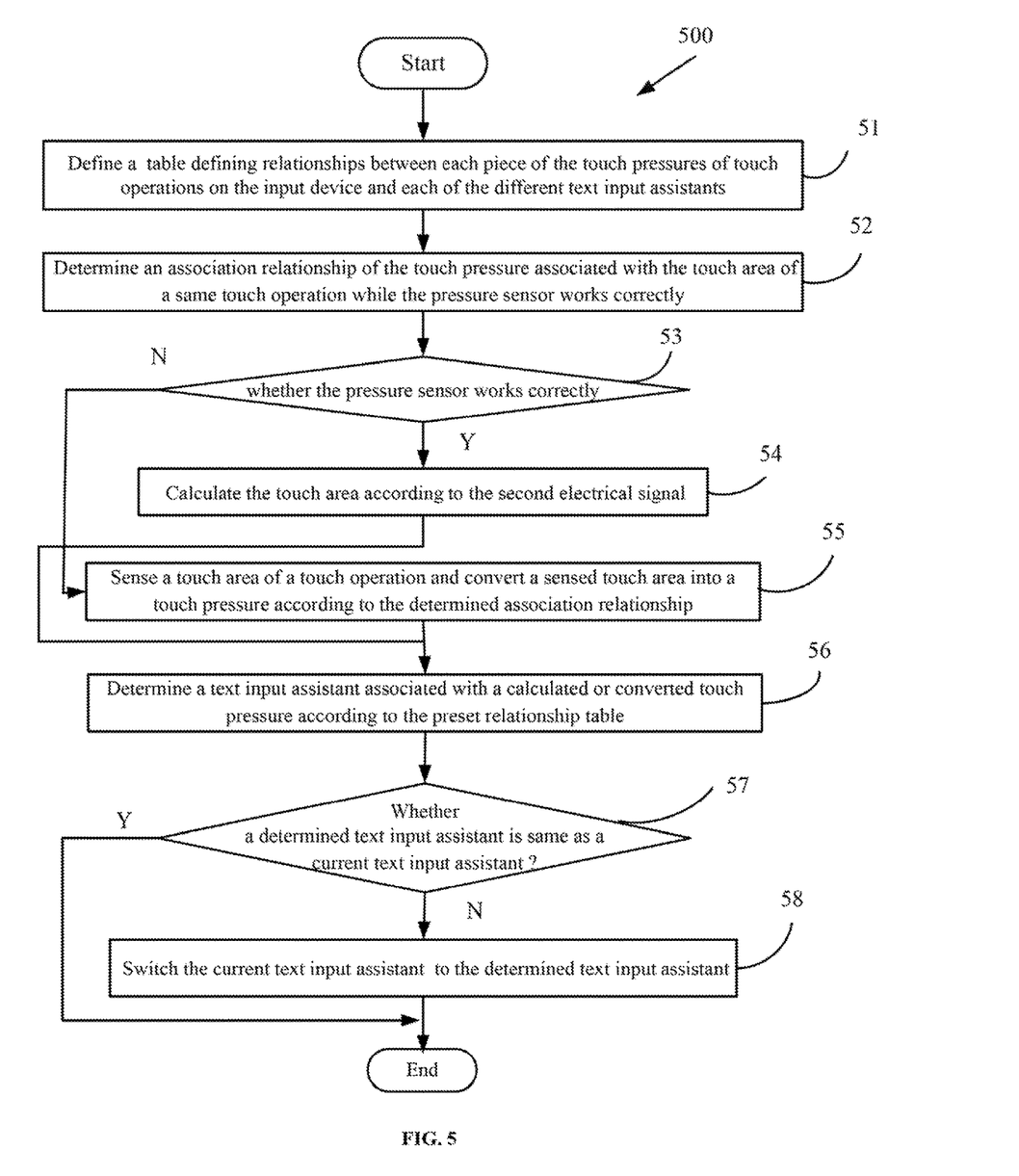
FIG. 5 is a flowchart according to one embodiment of a method for switching between text-input assistants, which is associated with a condition that a touch sensor does not work.

FIG. 5 is a flowchart of a third embodiment of a method for switching text input assistant, which shows the text input assistant is still switched according to the touch force of a touch operation while the force sensor 15 does not correctly work.

The example method 500 is provided by way of example, as there are a variety of ways to carry out the method. The method 500 described below can be carried out using the configurations illustrated in FIGS. 1 and 2, for example, and various elements of these figures are referenced in explaining example method 500. Each block shown in FIG. 5 represents one or more processes, methods or subroutines, carried out in the exemplary method 500. Additionally, the illustrated order of blocks is by example only and the order of the blocks can change. The exemplary method 500 can begin at block 51. Depending on the embodiment, additional steps can be added, others removed, and the ordering of the steps can be changed.

At block 51, the setting module defines table recording relationships between each of the touch forces of touch operation on the input device and each of the different text input assistants.

At block 52, the determination module determines an association relationship of the touch force associated with the touch area of a same touch operation while the force sensor works correctly.

In at least one embodiment, the association relationship of the touch force associated with the touch area of a touch operation is F=KS, where F denotes a touch force of a touch operation, S denotes a touch area of the touch operation, and K denotes the coefficient of the touch force associated to the touch area.

In at least one embodiment, the determination module 23 obtains touch forces and touch areas of at least two same touch operations at the same time, and determines the association relationship according to the obtained touch forces and the touch areas of the same touch operations.

At block 53, the determination module determines whether the force sensor works correctly. If yes, the process goes to block 54; if no, the process goes to block 55.

At block 54, the calculation module calculates the touch force according to the first electrical signal.

At block 55, the area sensor senses a touch area of a touch operation on the input device; and the determination module converts the sensed touch area into a touch force according to the determined association relationship.

At block 56, the determination module determines a text input assistant associated with the calculated or converted touch force according to the preset relationship table.

At block 57, the determination module determines whether a determined text input assistant is the same as a current text input assistant for the electronic device. If no, the process goes to block 58; if yes, the process goes to end.

At block 58, the switching module switches the current text input assistant to the determined text input assistant.

The embodiments shown and described above are only examples. Many details are often found in the art and many such details are therefore neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A method for switching between text input assistants being executed by at least one processor of an electronic device, the electronic device comprising a storage device configured to store a preset table recording relationships between each touch force of a touch operation on an input device and each of different text input assistants, the method comprising:

receiving a touch operation on the input device, the input device comprising a force sensor;

generating, via the force sensor, a first electrical signal, the first electrical signal associated with a touch force of the touch operation, wherein the input device further comprises an area sensor to sense a touch area of the touch operation and convert the touch area into a second electrical signal, the touch force is associated with the touch area of a same touch operation, the method further comprises:

determining an association relationship of the touch force associated with the touch area of the same touch operation while the force sensor works correctly; wherein the association relationship is F=KS, where F denotes the touch force, S denotes the touch area, and K denotes a coefficient of the touch force to the touch area;

calculating the touch force according to the first electrical signal;

determining a text input assistant associated with a calculated touch force according to the preset table, thus resulting in a selected text input assistant;

comparing whether the selected text input assistant is the same as a current text input assistant for the electronic device;

switching the current text input assistant to the selected text input assistant when the selected text input assistant is different from the current text input assistant; and displaying an input interface associated with the selected text input assistant.

2. The method of claim 1, wherein when the touch operation senses at least two points simultaneously touching the input device for inputting text, the touch force is a total of touch forces of all points touching the input device.

3. The method of claim 1, wherein when the force sensor does not correctly work, the method further comprises:

calculating the touch area according to the second electrical signal; and converting the touch area into the touch force according to the association relationship of the touch force and the touch area.

4. An electronic device, comprising:

an input device configured to receive a touch operation, the input device comprising a force sensor for sensing touch force of the touch operation and converting the touch force into a first electrical signal, wherein the input device further comprises an area sensor to detect touch area of the touch operation and convert the touch area into a second electrical signal, the touch force is associated with the touch area of a same touch operation;

a processor; and a storage device configured to store a preset table recording relationships between each touch force and each of different text input assistants and store one or more programs which, when executed by the processor, cause the processor to:

determine an association relationship of the touch force associated with the touch area of the same touch operation according to the touch forces and the touch areas, wherein the association relationship of the touch force and the touch area of the same touch operation is F=KS, where F denotes the touch force, S denotes a touch area, and K denotes a coefficient of the touch force and the touch area;

calculate the touch force according to the first electrical signal;

determine a text input assistant associated with a calculated touch force according to the preset table, thus resulting in a selected text input assistant;

compare whether the selected text input assistant is the same as a current text input assistant for the electronic device;

switch the current text input assistant to the selected text input assistant when the selected text input assistant is different from the current text input assistant; and display an input interface associated with the selected text input assistant.

5. The electronic device of claim 4, wherein if the touch operation is at least two points simultaneously touching the input device for inputting text, the touch force is a total of touch forces of all points touching the touch operation.

6. The electronic device of claim 4, wherein the first electrical signal is not generated when the force sensor does not correctly work, wherein the processor is further caused to:

calculate the touch area according to the second electrical signal; and convert the touch area into a touch force according to the association relationship of the touch force and the touch area.

7. A non-transitory storage medium having stored thereon instructions that, when executed by a processor of an electronic device, causes the processor to perform a method for switching input; the non-transitory storage medium storing a preset table recording relationships between each touch force of a touch operation on the input device and each of the different text input assistants, the input device further comprising an area sensor to sense touch area of the touch operation and converting the touch area into a second electrical signal, the touch force of the touch operation being associated with the touch area of the same touch operation; the method comprises:

receiving a touch operation on an input device, the input device comprising a force sensor;

generating, via the force sensor, a first electrical signal, the first electrical signal associated with a touch force of the touch operation;

determining a relationship of the touch force associated with the touch area of the same touch operation according to the touch forces and the touch areas, wherein the relationship of the touch force and the touch area of the same touch operation is F=KS, where F denotes the touch force, S denotes the touch area, and K denotes a coefficient of the touch force and the touch area;

calculating the touch force according to the first electrical signal;

determining a text input assistant associated with a calculated touch force according to the preset table, thus resulting in a selected text input assistant;

determining whether the selected text input assistant way is the same as a current text input assistant for the electronic device;

switching the current text input assistant to the selected text input assistant when the selected text input assistant is different from the current text input assistant; and displaying an input interface associated with the selected text input assistant.

8. The non-transitory storage medium of claim 7, wherein when the touch operation is at least two points simultaneously touching the input device for inputting text, the touch force is a total of touch forces of all points.

9. The non-transitory storage medium of claim 7, wherein the first electrical signal is not generated when the force sensor does not correctly work, the method further comprises:

calculating the touch area according to the second electrical signal; and converting a calculated touch area into a touch force according to the relationship of the touch force and the touch area.

* * * * *